US008038891B2

(12) United States Patent

Yokouchi

(10) Patent No.: US 8,038,891 B2

(45) Date of Patent: Oct. 18, 2011

(54) METHOD OF MANUFACTURING NOZZLE PLATE AND METHOD OF MANUFACTURING LIQUID EJECTION HEAD

(75) Inventor: Tsutomu Yokouchi, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 865 days.

(21) Appl. No.: 12/043,670

(22) Filed: Mar. 6, 2008

(65) Prior Publication Data

US 2008/0217290 A1 Sep. 11, 2008

(30) Foreign Application Priority Data

Mar. 7, 2007 (JP) ................................ 2007-057721

(51) Int. Cl.
*G01D 15/00* (2006.01)

(52) U.S. Cl. ................ 216/27; 216/37; 347/45; 347/47; 347/68; 347/72

(58) Field of Classification Search .................... 216/27, 216/37; 347/45, 47, 68–72
See application file for complete search history.

(56) References Cited

U.S. PATENT DOCUMENTS

| | | | | |
|---|---|---|---|---|
| 6,310,641 | B1 * | 10/2001 | Mrvos et al. | 347/47 |
| 7,025,439 | B2 * | 4/2006 | Laurer et al. | 347/47 |
| 7,441,871 | B2 * | 10/2008 | Nishijima | 347/47 |
| 7,530,667 | B2 * | 5/2009 | Furukawa et al. | 347/45 |
| 7,562,964 | B2 * | 7/2009 | Furukawa et al. | 347/45 |
| 7,568,785 | B2 * | 8/2009 | Deguchi et al. | 347/48 |

FOREIGN PATENT DOCUMENTS

| | | | |
|---|---|---|---|
| JP | 9-267478 | A | 10/1997 |
| JP | 2006-27155 | A | 2/2006 |
| JP | 2007-50583 | A | 3/2007 |

* cited by examiner

*Primary Examiner* — Lan Vinh
*Assistant Examiner* — Maki Angadi
(74) *Attorney, Agent, or Firm* — Birch, Stewart, Kolasch & Birch, LLP.

(57) ABSTRACT

The method of manufacturing a nozzle plate includes: a lyophobic film forming step of preparing a nozzle plate having a recess-shaped counterbore section and a nozzle opened in a bottom surface of the counterbore section, and forming a lyophobic film on a surface of the nozzle plate including the bottom surface of the counterbore section of the nozzle plate and at least a portion of an inner wall of the nozzle; an abutting step of preparing a protective plate having a projecting section, and abutting a top surface of the projecting section of the protective plate against the bottom surface of the counterbore section of the nozzle plate in such a manner that the top surface of the projecting section of the protective plate makes tight contact with an opening edge of the nozzle on a liquid ejection side of the nozzle plate; a lyophobic film removing step of removing the lyophobic film from the inner wall of the nozzle of the nozzle plate by etching the nozzle plate from a liquid supply side which is opposite to a side of the nozzle plate that is abutted against the protective plate; and a separating step of separating the protective plate from the nozzle plate.

14 Claims, 12 Drawing Sheets

METHOD OF MANUFACTURING NOZZLE PLATE AND METHOD OF MANUFACTURING LIQUID EJECTION HEAD

BACKGROUND OF THE INVENTION

1. Field of the Invention

The present invention relates to a method of manufacturing a nozzle plate and a method of manufacturing a liquid ejection head, by which a lyophobic (liquid-repellent) film is formed on a recess-shaped counterbore section.

2. Description of the Related Art

There are methods for forming a lyophobic film on the liquid ejection surface of a nozzle plate formed with nozzles, in which the lyophobic film is not formed on the inner walls of the nozzles. For example, there are a method in which a lyophobic film is formed only on the liquid ejection surface of a nozzle plate after embedding a filling material into the nozzles, and a method in which a lyophobic film is formed over the whole surface of a nozzle plate, and the unwanted portions are then removed.

Japanese Patent Application Publication No. 9-267478 discloses a method where a lyophobic film is formed on the whole surface of a nozzle plate in which nozzles are opened in a flat liquid ejection surface, whereupon an elastic body (silicon rubber or fluorine rubber) in the form of a sheet is attached to the flat liquid ejection surface and the lyophobic film on the inner walls of the nozzles is then removed by using an active gas.

However, in a method which embeds a filling material into the nozzles, there is a problem in that it is difficult to fill the material uniformly into all of the nozzles, in such a manner that none of the filling material projects beyond the opening of any of the plurality of nozzles. If the filling material projects from the opening of a nozzle on the liquid ejection surface, then a lyophobic film will not be formed in the vicinity of the edge of the nozzle opening. Furthermore, if the filling material is not embedded uniformly into all of the nozzles, then the state of formation of the lyophobic film in the vicinity of the nozzle opening on the liquid ejection surface will vary from nozzle to nozzle, and consequently there may be a variation in ejection characteristics between the nozzles. In particular, in a nozzle plate in which recess-shaped counterbore sections are formed, it is very difficult to embed a filling material into the nozzles which open respectively at the bottom surface of the counterbore sections in such a manner that there is no projection of the filling material from any of the nozzle openings and in such a manner that the filling material is embedded uniformly into each of the nozzles.

Moreover, in the method described in Japanese Patent Application Publication No. 9-267478, if recess-shaped counterbore sections are formed in the liquid ejection surface of the nozzle plate, then it is very difficult to attach a sheet-shaped elastic body in such a manner that it adheres tightly to the edges of the nozzle openings which are disposed in the bottom surfaces of the counterbore sections, and hence there is a problem in that the lyophobic film in the vicinity of the edges of the nozzles openings is removed and the ejection performance deteriorates.

Furthermore, since the elastic body is damaged when the lyophobic film is removed, then there is another problem in that the elastic body cannot be reused.

SUMMARY OF TIE INVENTION

The present invention has been devised in view of these circumstances, an object thereof being to provide a method of manufacturing a nozzle plate and a method of manufacturing a liquid ejection head whereby a highly accurate lyophobic film can be formed readily, even in the case of a nozzle plate having a counterbore section.

In order to accomplish an object described above, one aspect of the present invention relates to a method of manufacturing a nozzle plate comprising: a lyophobic film forming step of preparing a nozzle plate having a recess-shaped counterbore section and a nozzle opened in a bottom surface of the counterbore section, and forming a lyophobic film on a surface of the nozzle plate including the bottom surface of the counterbore section of the nozzle plate and at least a portion of an inner wall of the nozzle; an abutting step of preparing a protective plate having a projecting section, and abutting a top surface of the projecting section of the protective plate against the bottom surface of the counterbore section of the nozzle plate in such a manner that the top surface of the projecting section of the protective plate makes tight contact with an opening edge of the nozzle on a liquid ejection side of the nozzle plate; a lyophobic film removing step of removing the lyophobic film from the inner wall of the nozzle of the nozzle plate by etching the nozzle plate from a liquid supply side which is opposite to a side of the nozzle plate that is abutted against the protective plate; and a separating step of separating the protective plate from the nozzle plate.

In this aspect of the invention, after causing the top surface of the projecting section of the protective plate to make tight contact with the edge of the opening of the nozzle on the liquid ejection side thereof, etching is carried out from the liquid supply side which is opposite to the side where the protective plate is abutted; therefore, even in the case of a nozzle plate having a counterbore section, a lyophobic film is formed with good accuracy up to the edge of the nozzle opening, and it is possible to form a highly accurate lyophobic film readily, without forming a lyophobic film on the inner wall of the nozzle.

Desirably, an etching-resistant film having resistance with respect to the etching in the lyophobic film removal step is formed on at least the top surface of the projecting section of the protective plate.

In this aspect of the invention, there is no corrosion of the projecting section of the protective plate when removing the lyophobic film from the inner wall of the nozzle in the lyophobic film removal step, and therefore it is possible to reuse the protective plate and hence to reduce the manufacturing costs associated with the nozzle plate.

Desirably, the etching-resistant film on the protective plate is made of metal.

The metal film can be formed readily by sputtering or the like, and since the film is made of metal and has good ductility, then it is not liable to be damaged and caused to peel off, and the like, when the projecting section of the protective plate is abutted against the bottom surface of the counterbore section of the nozzle plate. Consequently, it is possible to reuse the protective plate, and the manufacturing costs of the nozzle plate can be reduced.

Desirably, a lyophobic film is formed at least on the top surface of the projecting section of the protective plate.

In this aspect of the invention, even if the top surface of the projecting section of the protective plate is abutted against the bottom surface of the counterbore section of the nozzle plate, the top surface of the projecting section of the protective plate does not become bonded to the bottom surface of the counterbore section of the nozzle plate, and therefore, peeling away of the lyophobic film on the nozzle plate is prevented when the protective plate and the nozzle plate are separated from each other.

Desirably, at least an abutting portion of the projecting section of the protective plate which abuts against the bottom surface of the counterbore section of the nozzle plate is made of an elastic body.

In this aspect of the invention, the adhesion between the opening edge of the nozzle in the nozzle plate and the top surface of the projecting section of the protective plate is improved.

Desirably, a non-abutting portion of the projecting section of the protective plate which is not the abutting portion and does not abut against the bottom surface of the counterbore section of the nozzle plate, is made of a material which deforms more readily than the abutting portion.

Desirably, the projecting section of the protective plate has a hollow structure.

In these aspects of the invention, it is possible both to prevent the projecting section of the protective plate from entering inside the nozzle orifice and to improve the tight contact between the opening edge of the nozzle in the nozzle plate and the top surface of the projecting section of the protective plate, by absorbing variation in the depth dimension of the counterbore section of the nozzle plate and variation in the height dimension of the projecting section of the protective plate.

Desirably, all or a portion of at least one of the nozzle plate and the protective plate is made of a member that is radiation-transmissive; and in the abutting step, a radiation beam is used to align positions of the projecting section of the protective plate and the counterbore section of the nozzle plate.

In this aspect of the invention, since the projecting section of the protective plate and the counterbore section of the nozzle plate are aligned accurately in position, then it is possible to form the lyophobic film accurately in the vicinity of the opening edge of the nozzle, while reliably protecting the lyophobic film.

Desirably, material of a flat section of the protective plate which supports the projecting section is the same as material of a substrate of the nozzle plate.

In this aspect of the invention, by aligning the coefficients of thermal expansion of the flat section of the protective plate and the nozzle plate, it is possible to prevent displacement between the plates even when the protective plate and the nozzle plate are heated in the lyophobic film removal step.

Desirably, an opening of the nozzle of the nozzle plate on the liquid ejection side has a circular shape having a radius of r, the bottom surface of the counterbore section of the nozzle plate has a circular shape having a radius of R, and the top surface of the projecting section of the protective plate has a circular shape having a diameter of D, and taking a distance between a center of the opening of the nozzle on the liquid ejection side and a center of the bottom surface of the counterbore section to be E, relationship $r+R+E<D<2R$ is satisfied.

In this aspect of the invention, in a case where the opening of the nozzle on the liquid ejection side has a circular shape, even if there is positional displacement between the counterbore section in the nozzle plate and the projecting section of the protective plate, the top surface of the projecting section of the protective plate is reliably caused to make contact with the edge of the opening of the nozzle in the nozzle plate.

Desirably, an opening of the nozzle of the nozzle plate on the liquid ejection side has a square shape having an edge length of 1, the bottom surface of the counterbore section of the nozzle plate has a square shape having an edge length of L, and the top surface of the projecting section of the protective plate has a square shape having an edge length of F, and taking a distance between a center of the opening of the nozzle on the liquid ejection side and a center of the bottom surface of the counterbore section to be E, relationship $\frac{1}{2}+L/2+E<F<L$ is satisfied.

In this aspect of the invention, in a case where the opening of the nozzle on the liquid ejection side has a square shape, even if there is positional displacement between the counterbore section in the nozzle plate and the projecting section of the protective plate, the top surface of the projecting section of the protective plate is reliably caused to make contact with the edge of the opening of the nozzle in the nozzle plate.

Another aspect of the invention relates to a method of manufacturing a liquid ejection head comprising the step of manufacturing a liquid ejection head by using a nozzle plate manufactured by any of the above-mentioned method of manufacturing a nozzle plate.

In this aspect of the invention, a liquid ejection head having excellent ejection characteristics is manufactured.

According to the present invention, even in the case of a nozzle plate having a counterbore section, it is possible readily to form a highly accurate lyophobic film.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein.

DETAILED DESCRIPTION OF THE PREFERRED EMBODIMENTS

To begin with, the method of manufacturing a nozzle plate relating to a first embodiment of the invention will be described with reference to the step diagrams in FIGS. 1A to 1E.

Figure 1A:
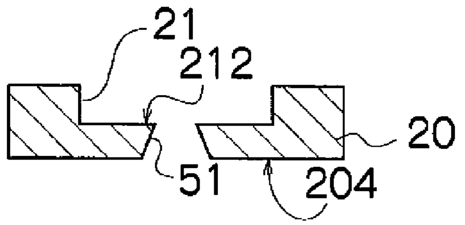
FIGS. 1A to 1E are step diagrams for describing a method of manufacturing a nozzle plate according to a first embodiment of the invention.

Firstly, as shown in FIG. 1A, a recess-shaped counterbore section 21 and a nozzle 51 which opens in the bottom face 212 of the counterbore section 21 are formed in a flat substrate. By this means, an initial nozzle plate 20 having counterbore sections 21 and nozzles 51 is obtained.

Possible materials for the substrate of the nozzle plate 20 include a metal such as stainless steel (SUS), silicon (Si), and the like.

Possible methods for forming the counterbore sections 21 and the nozzles 51 include electroforming, dry etching, and wet etching.

The nozzles 51 according to the present embodiment have a tapered shape in which the diameter of the flow channel narrows continuously from the liquid supply surface 204 to the liquid ejection surface, which is the bottom surface 212 of the counterbore section 21, but the shape of the nozzles 51 according to the present invention is not limited to a tapered shape and it is also possible for the nozzles to have a straight shape in which the flow channel diameter is the same from the liquid supply surface 204 until the bottom surface 212 of the counterbore section 21.

Figure 1B:
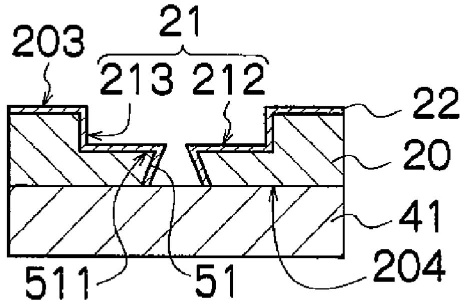

Thereupon, as shown in FIG. 1B, the liquid supply surface 204 of the nozzle plate 20 is protected by pressing a flat plate-shaped supporting body 41 against the liquid supply surface 204 of the nozzle plate 20, and in this state, a lyophobic film 22 is formed over the whole of the surface of the nozzle plate 20 on the liquid ejection side. In the present example, more specifically, a lyophobic film 22 is formed on the inner walls of the nozzle 51, as well as on the bottom surface 212 of the counterbore section 21, the side walls 213 of the counterbore section 21 and the peripheral region 203 of the counterbore section 21.

The material of the lyophobic film 22 can be made of, for example, a lyophobic material which can be removed by an oxygen plasma, such as a fluorine resin or fluoroalkyl silane, or a lyophobic material which can be removed by vacuum ultraviolet light, such as fluoroalkyl silane.

The method of forming the lyophobic film 22 may be based on CVD, vapor deposition, application, and the like. For example, if the radius of the opening edge 511 of the nozzle 51 on the liquid ejection side is 5 to 15 μm, then the thickness of the lyophobic film 22 is set to 0.001 to 3 μm.

In this example, the lyophobic film 22 is formed in a state where a filling material is not embedded into the nozzles 51 of the nozzle plate 20, and therefore, the lyophobic film 22 is also formed on the inner walls of the nozzles 51. However, in order to improve the ejection characteristics, it is necessary to make the inner walls of the nozzles 51 lyophilic, and therefore the portion of the lyophobic film 22 which is formed on the inner walls of the nozzles 51 is removed in a subsequent processing step. On the other hand, in order to improve the ejection characteristics, it is necessary to form a lyophobic film 22 on the bottom surface 212 of each of the counterbore sections 21 in the nozzle plate 20, up to the edge 511 of the opening of the nozzle 51.

In the present example, the supporting body 41 also serves as a mask, and a lyophobic film 22 is not formed on the liquid supply surface 204 of the nozzle plate 20, but the present invention is not limited to a case such as this and it can also be applied to a case where the lyophobic film is formed over the whole surface of the nozzle plate 20 including the liquid supply surface 204.

Figure 1C:
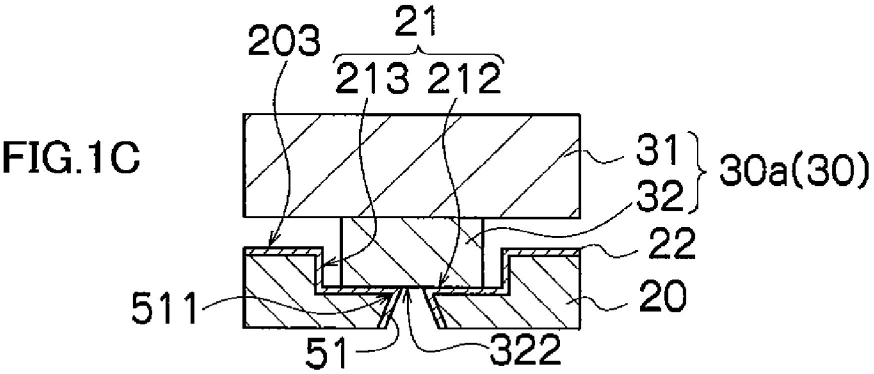

Next, as shown in FIG. 1C, a protective plate 30*a* having a flat section 31 and a projecting section 32 is prepared, the projecting section 32 of the protective plate 30*a* and the counterbore section 21 of the nozzle plate 20 are aligned in position, and the protective plate 30*a* is abutted against the nozzle plate 20. More specifically, the top surface 322 of the projecting section 32 of the protective plate 30*a* is abutted against the bottom surface 212 of the counterbore section 21 of the nozzle plate 20, in such a manner that the top surface 322 of the projecting section 32 of the protective plate 30*a* makes tight contact with the opening edge 511 of the nozzle 51 on the liquid ejection side.

Desirably, the protective plate 30*a* is formed at least partially by an elastic body. If the whole of the protective plate 30*a* is hard, then when the top surface 322 of the projecting section 32 of the protective plate 30*a* is abutted against the bottom surface 212 of the counterbore section 21 of the nozzle plate 20, problems may be liable to occur in that the top surface 322 of the projecting section 32 of the protective plate 30*a* does not make tight contact with the whole circumference of the opening edge 511 of the nozzle 51, or chips are caused in the opening edge 511 of the nozzle 51 by the projecting section 32 of the protective plate 30*a*.

In particular, it is desirable that the projecting section 32 of the protective plate 30*a* which abuts against the bottom surface 212 of the counterbore section 21 of the nozzle plate 20 is formed of an elastic body. If the projecting section 32 of the protective plate 30*a* is formed of an elastic body in this way, the flat section 31 of the protective plate 30*a* may be formed of either a rigid body or an elastic body. If the flat section 31 of the protective plate 30*a* is made of a rigid body, then the handling of the protective plate 30*a* is facilitated. On the other hand, if the flat section 31 of the protective plate 30*a* is made of an elastic body, then the protective plate 30*a* follows the shape of the nozzle plate 20 even if the nozzle plate 20 is warped, and therefore good adhesion is obtained between the top surface 322 of the projecting section 32 of the protective plate 30*a* and the opening edge 511 of the nozzle 51 in the nozzle plate 20.

The following modes are possible, for example, as a mode of aligning the positions of the projecting section 32 of the protective plate 30*a* and the counterbore section 21 of the nozzle plate 20.

Firstly, there is a mode in which the flat section 31 of the protective plate 30*a* is formed by a transparent member (for example, glass) which transmits visible light, and the projecting section 32 of the protective plate 30*a* and the counterbore section 21 of the nozzle plate 20 are aligned in position by using visible light.

Secondly, there is a mode in which at least one of the nozzle plate 20 and the flat section 31 of the protective plate 30*a* is formed of silicon (Si) which is transmissive with respect to infrared radiation, and the projecting section 32 of the protective plate 30*a* and the counterbore section 21 of the nozzle plate 20 are aligned in position by using such an infrared beam.

The radiation source used in the present embodiment is not limited in particular to visible light or infrared light, and a type of radiation other than these can also be used. In short, all or a portion of at least one of the nozzle plate 20 and the protective plate 30*a* is made of a member which transmits radiation of a particular wavelength, and the projecting section 32 of the protective plate 30*a* and the counterbore section 21 of the nozzle plate 20 are aligned in position by using that radiation.

Thirdly, there is a mode in which a through pattern is formed previously in either the nozzle plate 20 or the protective plate 30*a*, a positional alignment pattern is formed previously in the other of the nozzle plate 20 and the protective plate 30*a*, and the two patterns are aligned with each other.

The mode of pressing the protective plate 30*a* against the nozzle plate 20 may be based on pressurization by means of air, for example. In this way, a pressure differential is generated between the nozzle plate 20 side and the protective plate 30*a* side. Here, the top surface 322 of the projecting section 32 of the protective plate 30*a* and the bottom surface 212 of the counterbore section 21 of the nozzle plate 20 are pressurized uniformly throughout the plane of the surface. Moreover, it is desirable that the pressure variation should be determined and that the suitability of the close contact between the top surface 322 of the projecting section 32 of the protective plate 30*a* and the opening edge 511 of the nozzle 51 of the nozzle plate 20 should be judged on the basis of the determined pressure variation.

Figure 1D:
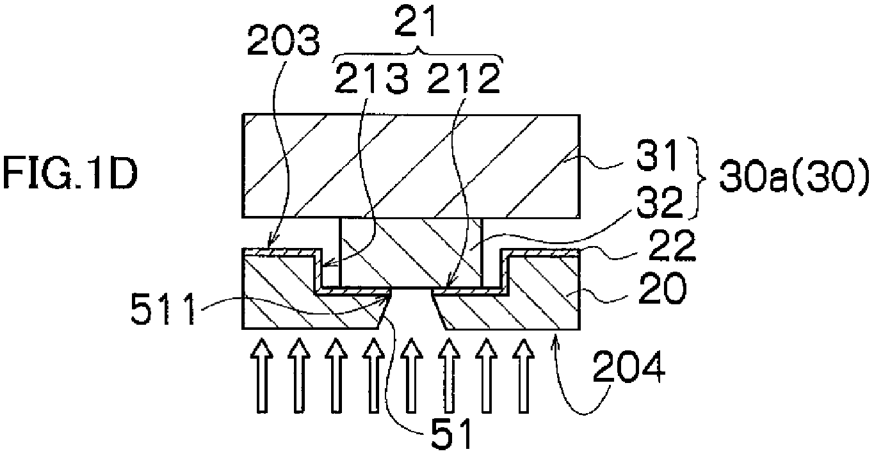

In a state where, as shown in FIG. 1C, the top surface 322 of the projecting section 32 of the protective plate 30*a* has been abutted against the bottom surface 212 of the counterbore section 21 of the nozzle plate 20, thereby placing the top surface 322 of the projecting section 32 in tight contact with the opening edge 511 of the nozzle 51, etching is then carried out, as shown in FIG. 1D, by irradiating an oxygen plasma (or vacuum ultraviolet light) from the side of the liquid supply surface 204 of the nozzle plate 20, thereby removing the lyophobic film 22 from the inner walls of the nozzle 51. In this case, the nozzle plate 20 itself is used as a mask, and furthermore, the lyophobic film 22 on the bottom surface 212 of the counterbore section 21 of the nozzle plate 20, up to the opening edge 511 of the nozzle 51, is protected by the projecting section 32 of the protective plate 30*a* and is left in place, rather than being removed.

Figure 1E:
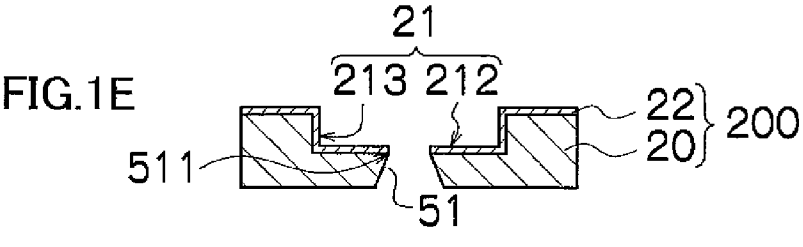

Thereupon, the protective plate 30*a* and the nozzle plate 20 are separated from each other. In so doing, as shown in FIG. 1E, a completed nozzle plate 200 is obtained in which a lyophobic film 22 has been formed on the bottom surface 212 of the counterbore section 21 up to the opening edge 511 of the nozzle 51 whereas the lyophobic film 22 has been removed from the inner walls of the nozzle 51.

The material of the flat section 31 of the protective plate 30 shown in FIG. 1C is desirably the same as the material of the substrate 20 of the nozzle plate. For example, the substrate 20 of the nozzle plate is made of silicon (Si), the flat section 31 of the protective plate 30 is made of the same silicon (Si) as the substrate 20 of the nozzle plate, and the projecting section 32 of the protective plate 30 is made of a dry film resist formed of a resin material. In this way, by forming the flat section 31 of the protective plate 30 which supports the projecting section 32 from the same material as the substrate 20 of the nozzle plate, and thus obtaining the same coefficient of thermal expansion in the flat section 31 of the protective plate 30 and the substrate 20 of the nozzle plate, then even if heat is applied to both the substrate 20 of the nozzle plate and the protective plate 30 in the lyophobic film removal step shown in FIG. 1D, no gaps occur between the plates.

Figure 2:
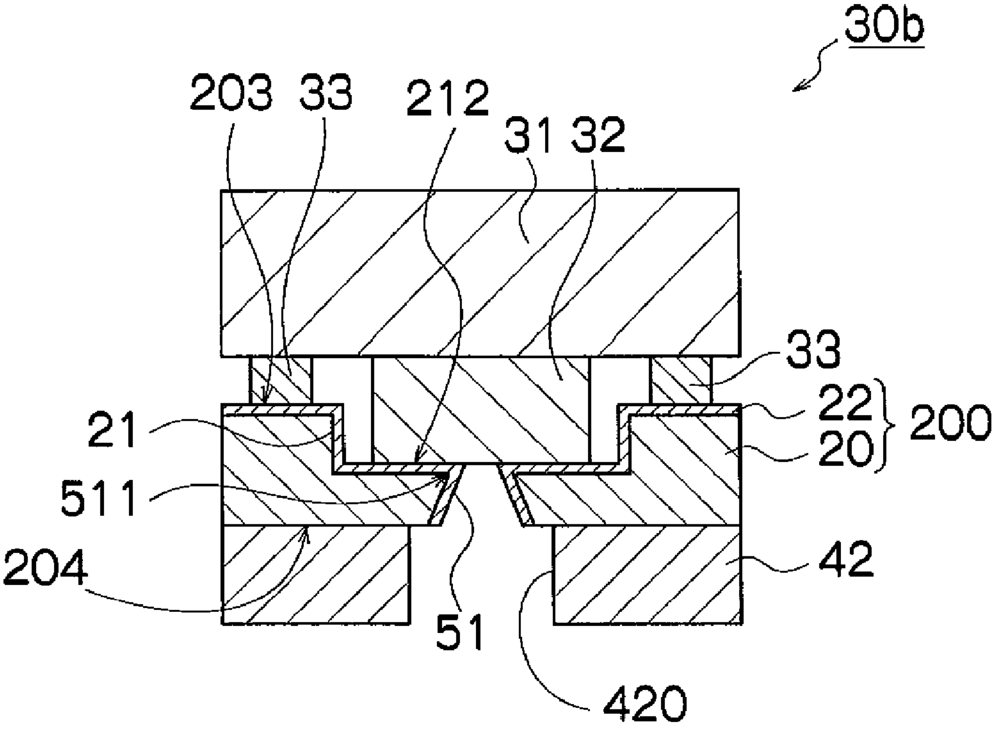
FIG. 2 is an illustrative diagram for describing a case where a support section is formed with a protective plate.

The protective plate according to the present embodiment is not limited in particular to the protective plate 30*a* shown in FIG. 1C. As shown in FIG. 2, it is also possible to use a protective plate 30*b* which, in addition to comprising the projecting section 32 that abuts against the bottom surface 212 of the counterbore section 21 of the nozzle plate 20, is also formed with a projection-shaped support section 33 that abuts against the peripheral region 203 of the counterbore section 21 of the nozzle plate 20. Furthermore, as shown in FIG. 2, it is desirable that the liquid supply surface 204 of the nozzle plate 20 (in other words, the surface on the opposite side to the surface which abuts against the protective plate 30*b*) should be held by a pressurization plate 42. An opening 420 having a larger surface area than the opening of the nozzle 51 on the liquid supply surface 204 is formed in the pressurization plate 42. By this means, when the protective plate 30*b* is pressed against the nozzle plate 20, the load can be distributed in such a manner that it does not concentrate in the vicinity of the nozzle 51 where the protective plate 30*b* and the nozzle plate 20 lie in tight contact, and therefore damage to the lyophobic film 22 at the opening edge 511 of the nozzle 51 of the nozzle plate 20 and the vicinity thereof, can be avoided.

Next, the method of manufacturing a nozzle plate according to a second embodiment will be described.

In the present embodiment, the plate used as the protective plate 30 shown in FIG. 1C and FIG. 1D is one where a film having resistance to the etching performed in the step of removing the lyophobic film 22 shown in FIG. 1D (hereinafter, called "etching-resistant film") is formed at least on the top surface 322 of the projecting section 32.

Figure 3A:
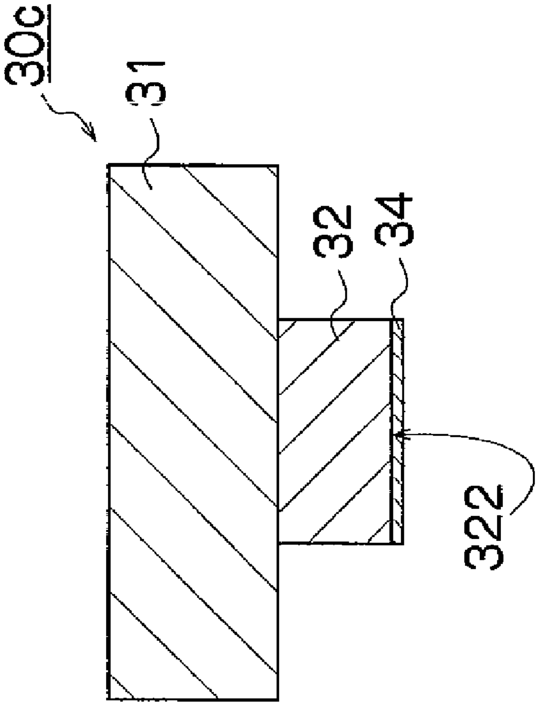
FIGS. 3A and 3B are illustrative diagrams for describing a method of manufacturing a nozzle plate according to a second embodiment of the invention.

The protective plate 30*c* shown in FIG. 3A has an etching-resistant film 34 formed only on the top surface 322 of the projecting section 32.

Figure 3B:
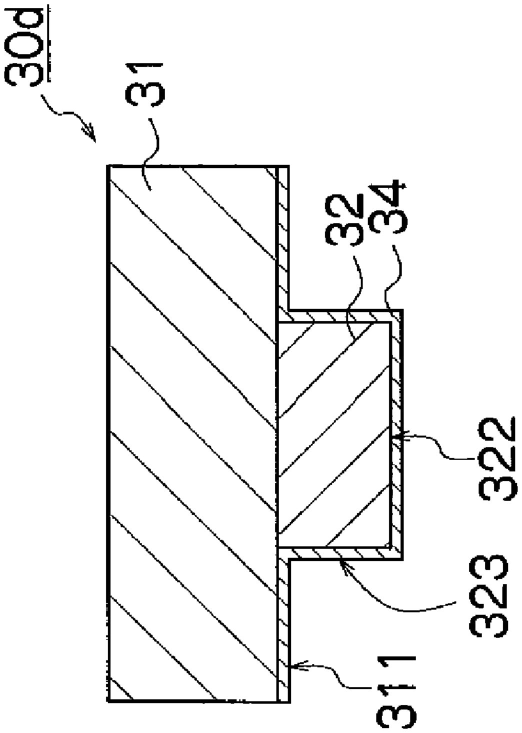

It is also possible to form an etching-resistant film 34 on the side walls 323 of the projecting section 32 and the flat surface 311 of the flat section 31, as well as on the top surface 322 of the projecting section 32, as shown in FIG. 3B illustrating the protective plate 30*d*.

A protective plate 30 (30*c*, 30*d*) formed with an etching-resistance film 34 of this kind is used in the process of manufacturing a nozzle plate shown in FIGS. 1A to 1E.

Furthermore, it is also possible to form an etching-resistant film 34 on the whole surface of the protective plate 30 shown in FIGS. 1C and 1D.

For example, if etching is carried out by an oxygen plasma process, then the protective plate 30 is protected by the etching-resistant film 34 so as to prevent erosion of the projecting section 32 in particular due to the oxygen plasma atmosphere. Furthermore, for example, if etching is carried out by irradiation of vacuum ultraviolet light, then the protective plate 30 is protected by the etching-resistant film 34 so as to prevent erosion of the projecting section 32 in particular due to the vacuum ultraviolet light.

Since the projecting section 32 is not damaged due to the presence of the etching-resistant film 34, then it is possible to reuse the protective plate 30 (30*c*, 30*d*). In particular, since work is involved in forming the projecting section 32, then by enabling the reuse of the protective plate 30, it is possible to reduce the costs relating to the manufacture of a nozzle plate.

In the process for manufacturing a protective plate 30*c* shown in FIG. 3A, the etching-resistant film 34 is formed only on the top surface 322 of the projecting section 32. Furthermore, in the process of manufacturing a protective plate 30*d* shown in FIG. 3B, the etching-resistant film 34 is also formed on the side walls 323 of the projecting section 32 and the flat surface 311 of the flat section 31, as well as on the top surface 322 of the projecting section 32. It is also possible to form the etching-resistant film 34 on the whole surface of the protective plate 30.

The etching-resistant film 34 is made of a metal film, for example. Such a metal film can be formed readily by sputtering, or the like, and furthermore, even supposing that the projecting section 32 deforms slightly when the protective plate 30 is pressed against the nozzle plate 20, since the film is a metal film, then it has good ductility, and damage such as fracturing of the film is not liable to occur.

For example, Au, Ni, Al, Pt, Ti or Cr is used as the material of the metal film and such a metal film having a thickness of 0.05 to 0.2 μm can be formed by sputtering.

Next, the method of manufacturing a nozzle plate according to a third embodiment will be described.

In the present embodiment, the plate used for the protective plate 30 shown in FIGS. 1C and 1D is one having a lyophobic film formed on at least the top surface 322 of the protecting section 32.

Figure 4B:
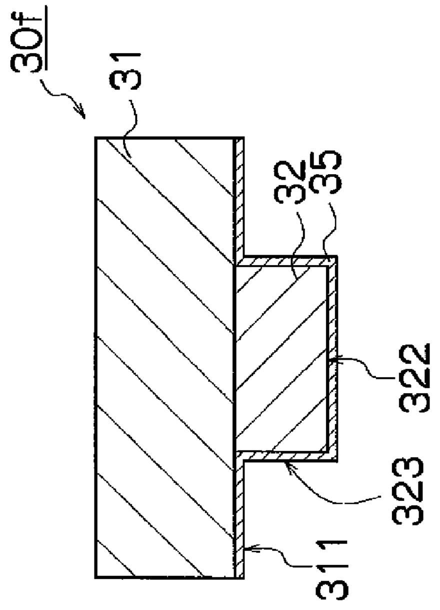
FIGS. 4A to 4C are illustrative diagrams for describing a method of manufacturing a nozzle plate according to a third embodiment of the invention.
Figure 4C:
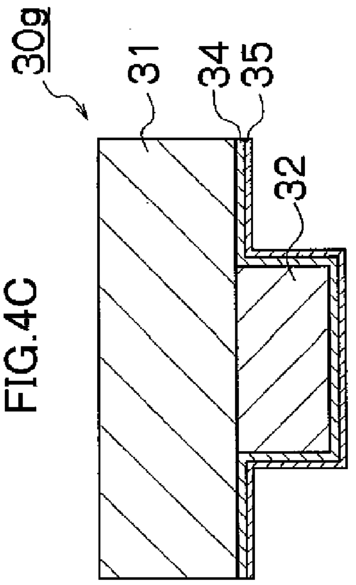
Figure 4A:
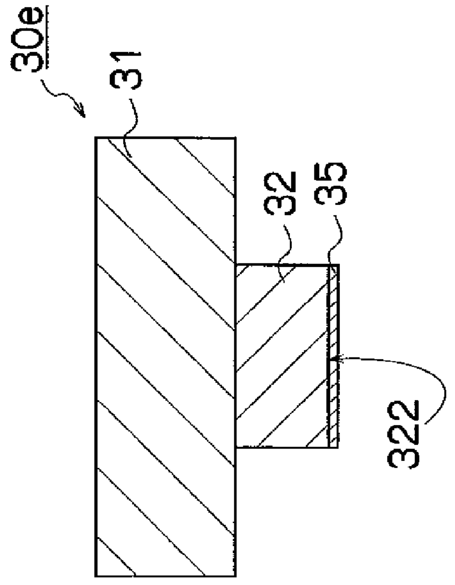

The protective plate 30*e* shown in FIG. 4A has a lyophobic film 35 formed only on the top surface 322 of the projecting section 32.

It is also possible to form a lyophobic film 35 on the side walls 323 of the projecting section 32 and the flat surface 311 of the flat section 31, as well as on the top surface 322 of the projecting section 32, as in the protective plate 30*d* shown in FIG. 4B.

A protective plate 30 (30*e*, 30*f*) formed with a lyophobic film 35 of this kind is used in the process of manufacturing a nozzle plate shown in FIGS. 1A to 1E.

Furthermore, it is also possible to form the lyophobic film 35 on the whole surface of the protective plate 30 shown in FIGS. 1C and 1D.

If the top surface 322 of the projecting section 32 of the protective plate 30 makes contact with the bottom surface 212 of the counterbore section 21 of the nozzle plate 20 when the protective plate 30 is pressed against the nozzle plate 20 as shown in FIG. 1C, then the lyophobic film 22 on the nozzle plate 20 may peel away in the step of separating the protective plate 30 and the nozzle plate 20 shown in FIG. 1E. However, the lyophobic film 35 on the protective plates 30*e* and 30*f* according to the present embodiment prevents such contact in the step in FIG. 1C, and therefore prevents the lyophobic film 22 from being peeled away from the nozzle plate 20.

In the process for manufacturing a protective plate 30*e* shown in FIG. 4A, the lyophobic film 35 is formed only on the top surface 322 of the projecting section 32. Furthermore, in the process of manufacturing a protective plate 30*f* shown in FIG. 4B, the lyophobic film 35 may be also formed on the side walls 323 of the projecting section 32 and the flat surface 311 of the flat section 31, as well as on the top surface 322 of the projecting section 32. A lyophobic film 35 may be also formed on the whole surface of the protective plate 30.

As described above, in the present embodiment, the lyophobic film 35 is formed at least on the portion, of the surface of the protective plate 30, which makes contact with the opening edge 511 of the nozzle 51 in the nozzle plate 20, and the vicinity thereof.

The lyophobic film 35 on the protective plate 30 is made, for example, of the same material as the lyophobic film 22 on the nozzle plate 20 and is formed to the same thickness as the lyophobic film 22 on the nozzle plate 20 by using the same method as that used for the lyophobic film 22 on the nozzle plate 20.

Furthermore, it is also possible to form both the etching-resistant film 34 described in the second embodiment above and the lyophobic film 35 shown in FIG. 4B, as in the protective plate 30*g* shown in FIG. 4C. In the process of manufacturing a protective plate 30*g* of this kind, the etching-resistant film 34 made of a metal film is formed on the surface of the protective plate 30*g* and the lyophobic film 35 is formed on top of this etching-resistant film 34. By adopting a protective plate 30*g* of this kind which is formed with the etching-resistant film 34 and the lyophobic film 35, it is possible to prevent damage to the protective plate 30*g* during the etching process, and it is also possible to prevent the lyophobic film 22 from being peeled away from the nozzle plate 20. The protective plate 30*g* according to the present embodiment can be reused simply by reforming a lyophobic film 35 on the surface thereof.

Figure 5A:
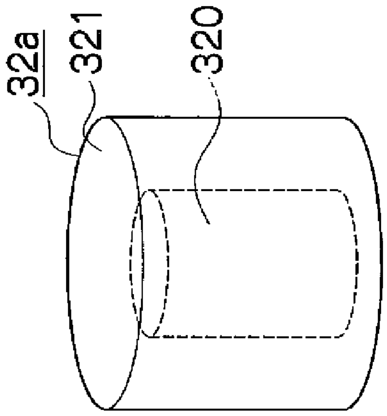
FIGS. 5A to 5C are oblique diagrams showing various shapes of the projecting section of the protective plate.
Figure 5B:
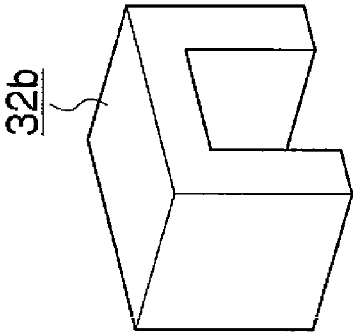
Figure 5C:
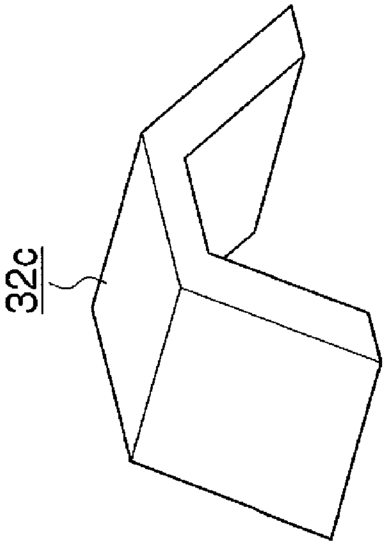

FIGS. 5A to 5C show examples of the form of the projecting section 32 of the protective plates 30 (30*a* to 30*g*) which are shown in FIGS. 1 to 4.

The projecting section 32*a* shown in FIG. 5A is a round cylindrical shape, which is constituted by an outer section 321 that abuts against the bottom surface 212 of the counterbore section 21 in the nozzle plate 20 as shown in FIG. 1C (hereinafter, called "abutting section"), and an inner section 320 that does not abut against the bottom surface 212 of the counterbore section 21 of the nozzle plate 20 (hereinafter, called "non-abutting section"). Here, the inner section 320 has a lower Young's modulus and hence a greater deformability than the outer section 321.

If the outer section 321 of the projecting section 32*a* is too soft, then when the top surface of the projecting section 32*a* makes tight contact with the opening edge 511 of the nozzle 51 as shown in FIG. 1C, a portion of the projecting section 32*a* enters inside the opening of the nozzle 51. Furthermore, if the whole of the projecting section 32*a* is hard, then it may not absorb variations in the depth of the counterbore section 21 and/or variations in the height of the projecting section 32*a* itself shown in FIG. 1C, and therefore it becomes difficult to make the top surface of the projecting section 32*a* achieve tight contact with the opening edge 511 of the nozzle 51. In particular, if manufacturing a nozzle plate having a plurality of nozzles 51, then marked variation in ejection performance may occur between the nozzles 51.

Since the outer section 321 of the projecting section 32*a* according to the present example has a high Young's modulus, then it does not enter inside the nozzle 51 formed in the bottom surface 212 of the counterbore section 21, and furthermore, since the inner section 320 has a low Young's modulus, then it is possible to achieve tight contact between the top surface of the projecting section 32*a* and the opening edge 511, reliably, for all of the nozzles 51.

The process for manufacturing a protective plate 30 having the projecting section 32*a* shown in FIG. 5A is now described with reference to FIGS. 6A to 6D.

Figure 6A:
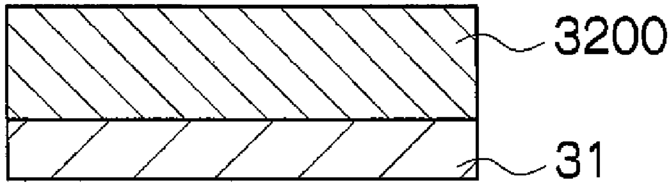
FIGS. 6A to 6D are step diagrams used to describe a process for manufacturing a protective plate according to a first example.
Figure 6B:
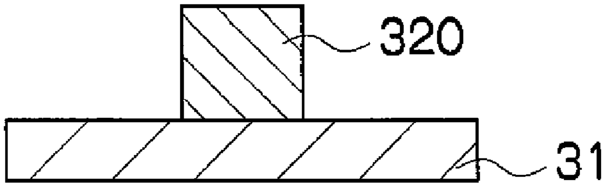
Figure 6C:
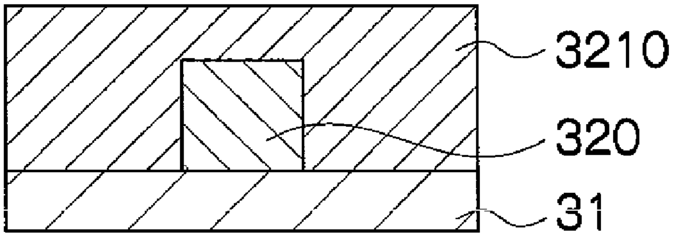
Figure 6D:
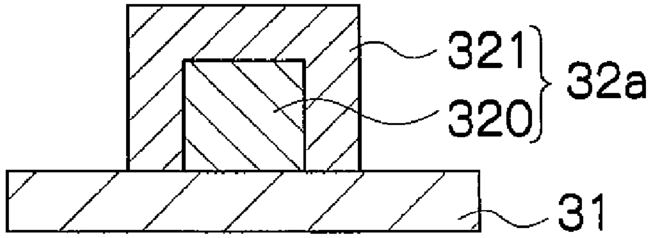
Figure 7A:
FIGS. 7A and 7B are plan diagrams of the projecting section of the protective plate according to the first example.
Figure 7B:
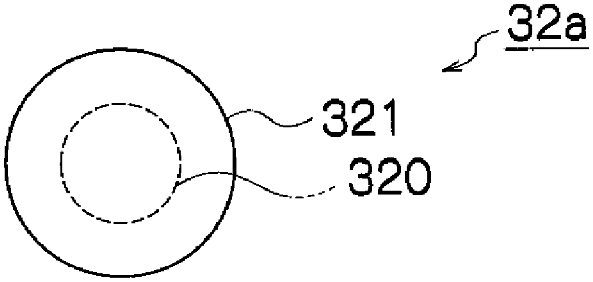

Firstly, as shown in FIG. 6A, a resist is applied as a first resin material 3200 onto a substrate which is to form the flat section 31, whereupon, as shown in FIG. 6B, the inner section 320 is formed by patterning it in a round cylindrical shape. FIG. 7A shows a plan view of the inner section 320 in FIG. 6B, as viewed from above. Thereupon, as shown in FIG. 6C, a second resin material 3210 is applied onto the flat section 31 so as to cover the inner section 320, and as shown in FIG. 6D, the outer section 321 is formed by patterning it in a round cylindrical shape. In so doing, a projecting section 32*a* as shown in FIG. 5A is formed on the flat section 31. FIG. 7B shows a plan view of the projecting section 32*a* in FIG. 6D, as viewed from above.

For the first resin material 3200, it is possible to use a urethane-based photosensitive resin, for example, and for the second resin material 3210, it is possible to use an epoxy-based photosensitive resin, for example.

FIGS. 6A to 6D show a case where the inner section 320 having a lower Young's modulus than the outer section 321 is formed, but it is also possible to form a projecting section 32 which has a hollow structure. In other words, the inner portion 320 shown in FIG. 5A may be a void. In forming a protective plate 30 having a projecting section 32 of a hollow structure as described above, after the steps shown in FIGS. 6A to 6D, the second resin material which constitutes the inner section 320 shown in FIG. 6D should be removed.

FIGS. 5B and 5C shows projecting sections 32*b*, 32*c* according to further examples, which have a hollow structure.

Figure 8A:
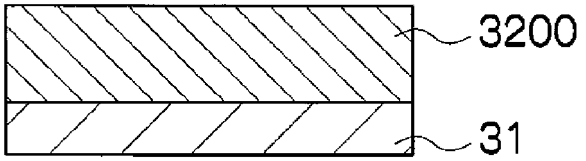
FIGS. 8A to 8E are step diagrams used to describe a process for manufacturing a protective plate according to a second example.
Figure 8B:
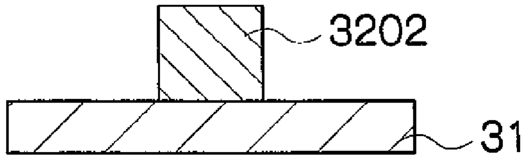
Figure 8C:
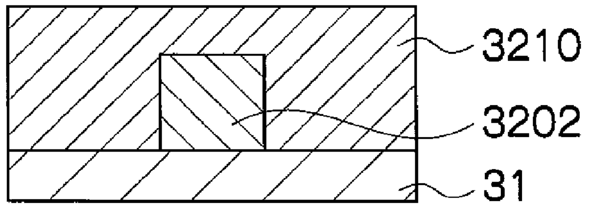
Figure 8D:
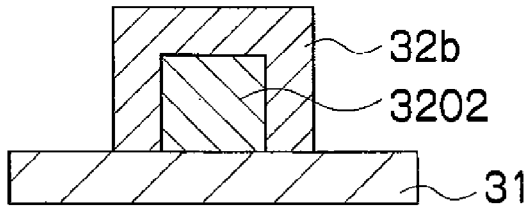
Figure 8E:
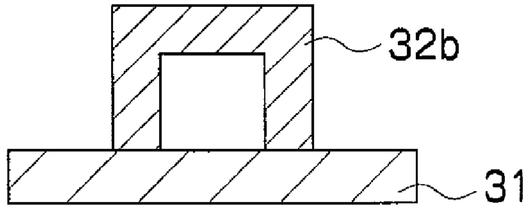

The protective plate 30 having the projecting section 32*b* shown in FIG. 5B is formed by firstly applying a resist, as the first resin material 3200, to a substrate which is to form the flat section 31, as shown in FIG. 8A, and then forming a mold 3202 by patterning, as shown in FIG. 8B. Thereupon, as shown in FIG. 8C, a second resin material 3210 is applied onto the flat section 31, so as to cover the mold 3202, and as shown in FIG. 8D, a projecting section 32*b* forming the outer section is created by patterning, and as shown in FIG. 8E, the mold 3202 is then removed. In so doing, a protective plate 30 having a projecting section 32*b* of a hollow structure as shown in FIG. 5B is obtained.

Figure 9A:
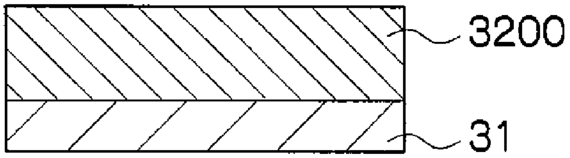
FIGS. 9A to 9F are step diagrams used to describe a process for manufacturing a protective plate according to a third example.
Figure 9B:
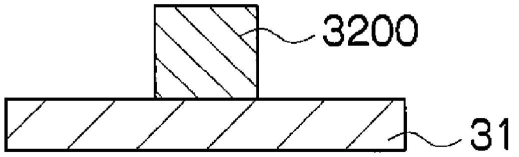
Figure 9C:
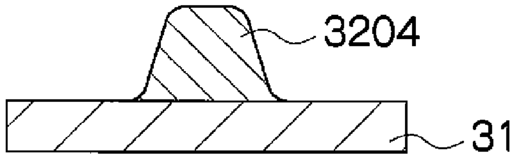
Figure 9D:
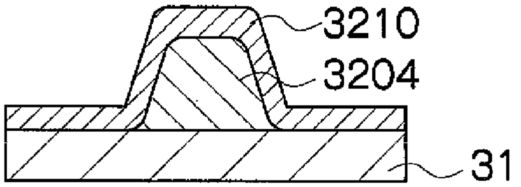
Figure 9E:
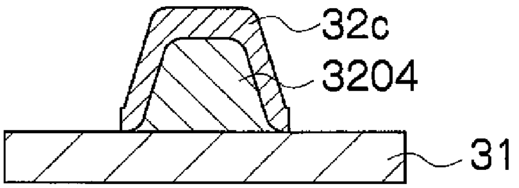
Figure 9F:
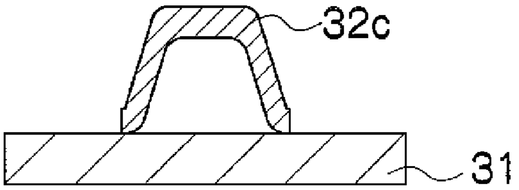

The protective plate 30 having the projecting section 32*c* shown in FIG. 5C is formed by applying a resist, as the first resin material 3200, to a substrate which is to form the flat section 31, as shown in FIG. 9A, and then forming a mold 3204 by carrying out patterning as shown in FIG. 9B and heat treatment as shown in FIG. 9C. Thereupon, as shown in FIG. 9D, a second resin material 3210 is applied by spraying so as to cover the mold 3204, and as shown in FIG. 9E, a projecting section 32*c* forming the outer section is created by patterning, whereupon the mold 3204 is removed as shown in FIG. 9F. In so doing, a protective plate 30 having a projecting section 32*c* of a hollow structure as shown in FIG. 5C is obtained.

Next, the correspondences between the dimensions of the projecting section 32 of the protective plate 30 and the counterbore section 21 of the nozzle plate 20 will be described.

Figure 10B:
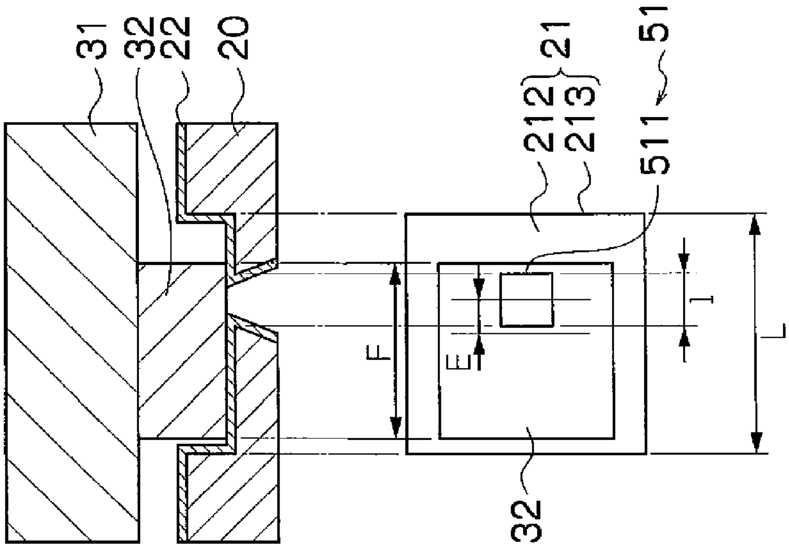
FIGS. 10A and 10B are illustrative diagrams used to describe the correspondence between the dimensions of the projecting section of the protective plate and a counterbore section of the nozzle plate.
Figure 10A:
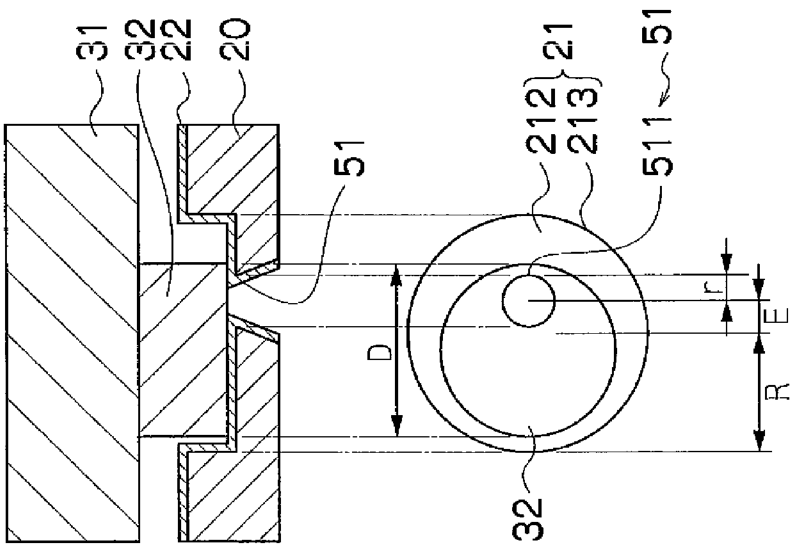

FIG. 10A shows a case where the opening edge 511 on the liquid ejection side of the nozzle 51 in the nozzle plate 20, the bottom surface 212 of the counterbore section 21 in the nozzle plate 20, and the top surface of the projecting section 32 of the protective plate 30 are all circular in shape.

In FIG. 10A, taking the radius of the opening edge 511 of the nozzle 51 to be r, taking the radius of the bottom surface 212 of the counterbore section 21 to be R, taking the diameter of the top surface of the projecting section 32 to be D and taking the distance between the center of the opening of the nozzle 51 and the center of the bottom surface 212 of the counterbore section 21 to be E, then the relationship, $r+R+E<D<2R$, is satisfied.

FIG. 10B shows a case where the opening edge 511 on the liquid ejection side of the nozzle 51 in the nozzle plate 20, the bottom surface 212 of the counterbore section 21 in the nozzle plate 20, and the top surface of the projecting section 32 of the protective plate 30 are all square in shape.

In FIG. 10B, taking the length of one edge of the opening edge 511 of the nozzle 51 to be 1, taking the length of one edge of the bottom surface of the counterbore section 21 to be L, taking the length of one edge of the top surface of the projecting section 32 to be F and taking the distance between the center of the opening of the nozzle 51 and the center of the bottom surface 212 of the counterbore section 21 to be E, then the relationship, $\frac{1}{2}+L/2+E<F<L$, is satisfied.

Figure 11A:
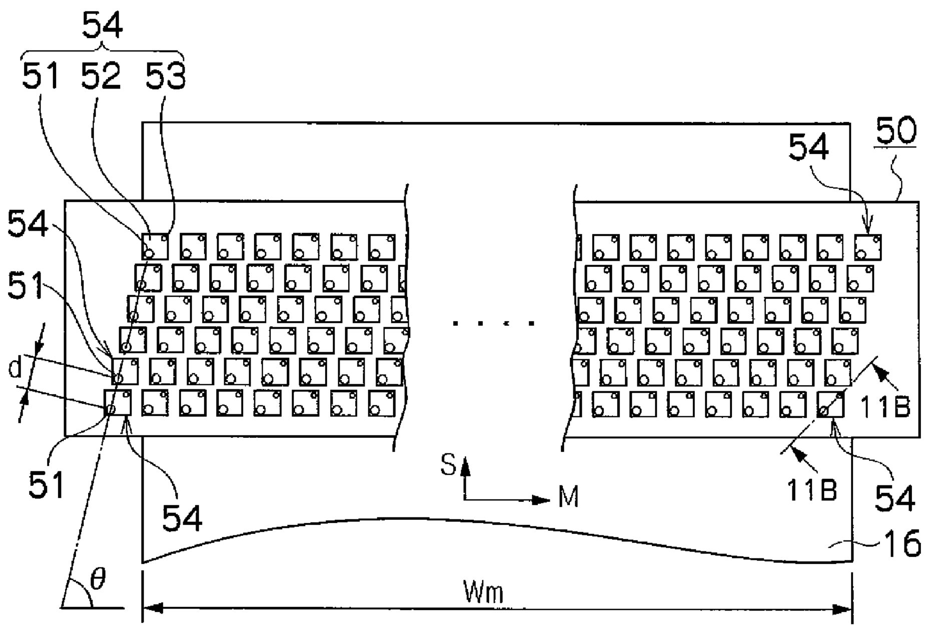
FIG. 11A is a plan view perspective diagram showing the general composition of one example of the liquid ejection head.

FIG. 11A is a plan view perspective diagram showing the general composition of one example of a liquid ejection head 50.

The liquid ejection head 50 shown as an example in FIG. 11A is a so-called full line liquid ejection head, having a structure in which a lot of nozzles 51 (liquid ejection ports) which eject droplets of ink toward a medium 16 are arranged in a two-dimensional configuration through a length corresponding to the width Wm of the ejection receiving medium 16 in the direction (the main scanning direction indicated by arrow M in FIG. 11A) perpendicular to the direction of conveyance of the ejection receiving medium 16 (the sub-scanning direction indicated by arrow S in FIG. 11A).

The liquid ejection head 50 comprises a plurality of liquid ejection elements 54, each comprising a nozzle 51 which ejects liquid, a pressure chamber 52 connected to the nozzle 51, and a liquid supply port 53 for supplying the liquid to the pressure chamber 52, the recording elements 54 being arranged in two directions, namely, a main scanning direction M and an oblique direction forming a prescribed acute angle θ (where $0°<\theta<90°$) with respect to the main scanning direction M. In FIG. 11A, in order to simplify the drawing, only a portion of the liquid ejection elements 54 is depicted in the drawing.

In specific terms, the nozzles 51 are arranged at a uniform pitch d in the direction forming the prescribed acute angle of θ with respect to the main scanning direction M, and hence the nozzle arrangement can be treated as equivalent to a configuration in which nozzles are arranged at an interval of $d \times \cos\theta$ in a single straight line following the main scanning direction M.

Figure 11B:
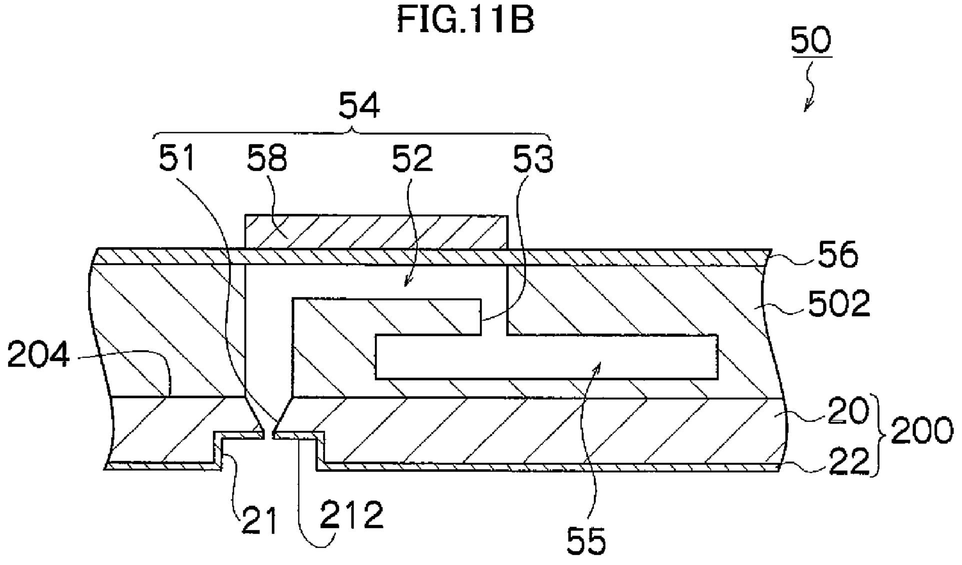
FIG. 11B is a cross-sectional diagram along line 11B-11B in FIG. 11A.

Furthermore, FIG. 11B shows a cross-sectional diagram along line 11B-11B in FIG. 11A.

In FIG. 11B, the liquid ejection head 50 comprises nozzles 51 which eject liquid, pressure chambers 52 which are connected to the nozzles 51 and into which liquid is filled, liquid supply ports 53 for supplying the liquid to the pressure chambers 52, a common flow channel 55 which is connected to the pressure chambers 52 via the liquid supply ports 53, and piezoelectric elements 58 which form actuators changing the pressure inside the pressure chambers 52.

FIG. 11B shows only one liquid ejection element 54, in order to simplify the illustration, but the liquid ejection head 50 actually is constituted by a plurality of liquid ejection elements 54 which are arranged in a two-dimensional configuration as shown in FIG. 11A. More specifically, each liquid ejection element 54 comprises one nozzle 51 one pressure chamber 52, one liquid supply port 53, and one piezoelectric element 58. In other words, in practice, the liquid ejection head 50 comprises a plurality of nozzles 51, a plurality of pressure chambers 52, a plurality of liquid supply ports 53 and a plurality of piezoelectric elements 58.

The liquid ejection head 50 is constituted by bonding a nozzle plate 200 formed with counterbore sections 21, a lyophobic film 22 and nozzles 51, onto a pressure chamber plate 502 which is formed with pressure chambers 52 and the like.

The pressure chambers 52, the liquid supply ports 53 and the common flow channel 55 are formed in the pressure chamber plate 502.

A diaphragm 56 is bonded to the surface of the pressure chamber plate 502 on the opposite side to the bonding surface 204 with the nozzle plate 200 (the liquid supply surface), and this diaphragm 56 constitutes a ceiling plate of the pressure chambers 52. The piezoelectric elements 58 are formed on the diaphragm 56.

Figure 12:
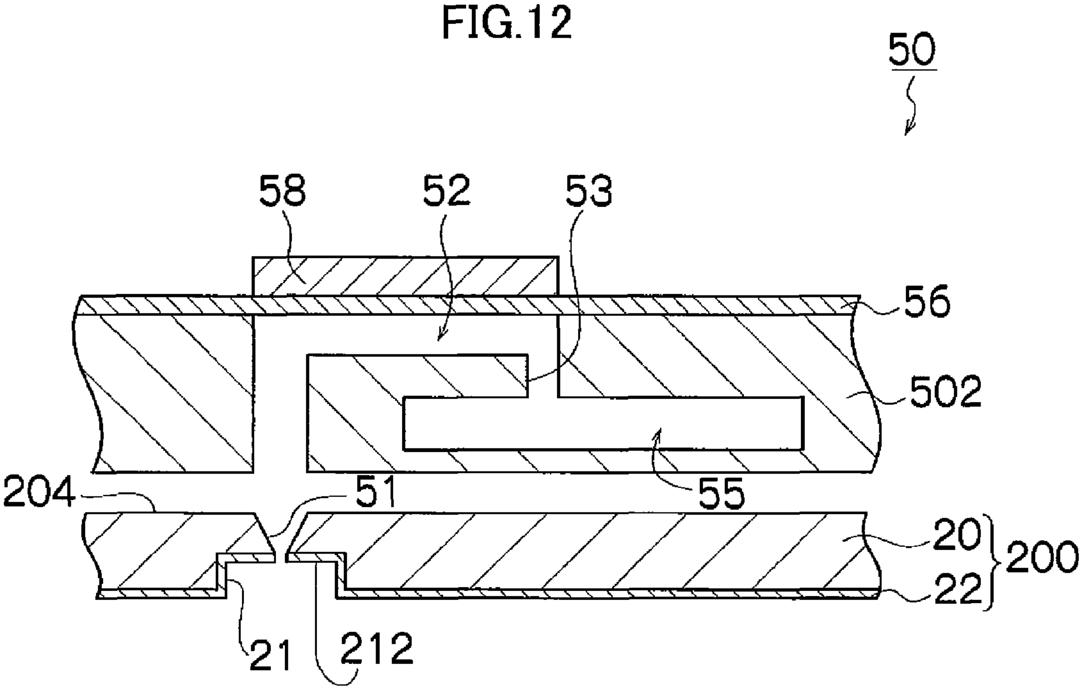
FIG. 12 is an illustrative diagram used to describe a process of manufacturing a liquid ejection head.

FIG. 12 shows one example of a process for manufacturing a liquid ejection head 50 shown in FIGS. 11A and 11B. In the present example, a nozzle plate 200 manufactured by the manufacturing process shown in FIGS. 1A to 1E (in other words, a nozzle plate formed with a lyophobic film 22) is bonded to a pressure chamber plate 502 which is formed previously with the pressure chambers 52, the liquid supply ports 53 and the common flow channel 55. The diaphragm 56 and the piezoelectric elements 58 may be formed after bonding the nozzle plate 200 to the pressure chamber plate 502.

A so-called piezo type of liquid ejection head which generates an ejection force by means of piezoelectric elements is described above, as a liquid ejection head, but it is also possible to apply the present invention to a liquid ejection head based on a system other than a piezo system, such as a so-called thermal type of liquid ejection head which generates an ejection force by means of heaters.

Furthermore, the liquid ejected from the liquid ejection head is not limited in particular to an ink, and it may be any liquid which can be ejected from nozzles.

The present invention is not limited to the examples described in the present specification or shown in the drawings, and various design modifications and improvements may of course be implemented without departing from the scope of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a nozzle plate comprising:

a lyophobic film forming step of preparing a nozzle plate having a recess-shaped counterbore section and a nozzle opened in a bottom surface of the counterbore section, and forming a lyophobic film on a surface of the nozzle plate including the bottom surface of the counterbore section of the nozzle plate and at least a portion of an inner wall of the nozzle, said counterbore section having a shape in which a peripheral region of the nozzle is recessed in a surface of the liquid ejection side of the nozzle plate;

an abutting step of preparing a protective plate having a projecting section, and abutting a top surface of the projecting section of the protective plate against the bottom surface of the counterbore section of the nozzle plate in such a manner that the top surface of the projecting section of the protective plate makes tight contact with an opening edge of the nozzle on a liquid ejection side of the nozzle plate;

a lyophobic film removing step of removing the lyophobic film from the inner wall of the nozzle of the nozzle plate by etching the nozzle plate from a liquid supply side which is opposite to a side of the nozzle plate that is abutted against the protective plate; and a separating step of separating the protective plate from the nozzle plate, wherein after forming the lyophobic film, the projecting section of the protective plate is abutted against a bottom surface of a recessed part of the counterbore section, from the liquid ejection side of the nozzle, the nozzle plate is etched while the top surface of the projecting section of the protective plate makes tight contact with the bottom surface of the counterbore section, and after removing the lyphobic film from the inner wall of the nozzle by etching, the protective plate is separated from the nozzle plate.

2. The method of manufacturing a nozzle plate as defined in claim 1, wherein an etching-resistant film having resistance with respect to the etching in the lyophobic film removal step is formed on at least the top surface of the projecting section of the protective plate.

3. The method of manufacturing a nozzle plate as defined in claim 2, wherein the etching-resistant film on the protective plate is made of metal.

4. The method of manufacturing a nozzle plate as defined in claim 1, wherein a lyophobic film is formed at least on the top surface of the projecting section of the protective plate.

5. The method of manufacturing a nozzle plate as defined in claim 1, wherein at least an abutting portion of the projecting section of the protective plate which abuts against the bottom surface of the counterbore section of the nozzle plate is made of an elastic body.

6. The method of manufacturing a nozzle plate as defined in claim 5, wherein a non-abutting portion of the projecting section of the protective plate which is not the abutting portion and does not abut against the bottom surface of the counterbore section of the nozzle plate, is made of a material which deforms more readily than the abutting portion.

7. The method of manufacturing a nozzle plate as defined in claim 5, wherein the projecting section of the protective plate has a hollow structure.

8. The method of manufacturing a nozzle plate as defined in claim 1, wherein:

all or a portion of at least one of the nozzle plate and the protective plate is made of a member that is radiation-transmissive; and in the abutting step, a radiation beam is used to align positions of the projecting section of the protective plate and the counterbore section of the nozzle plate.

9. The method of manufacturing a nozzle plate as defined in claim 1, wherein material of a flat section of the protective plate which supports the projecting section is the same as material of a substrate of the nozzle plate.

10. The method of manufacturing a nozzle plate as defined in claim 1, wherein an opening of the nozzle of the nozzle plate on the liquid ejection side has a circular shape having a radius of r, the bottom surface of the counterbore section of the nozzle plate has a circular shape having a radius of R, and the top surface of the projecting section of the protective plate has a circular shape having a diameter of D, and taking a distance between a center of the opening of the nozzle on the liquid ejection side and a center of the bottom surface of the counterbore section to be E, relationship $r+R+E<D<2R$ is satisfied.

11. The method of manufacturing a nozzle plate as defined in claim 1, wherein an opening of the nozzle of the nozzle plate on the liquid ejection side has a square shape having an edge length of l, the bottom surface of the counterbore section of the nozzle plate has a square shape having an edge length of L, and the top surface of the projecting section of the protective plate has a square shape having an edge length of F, and taking a distance between a center of the opening of the nozzle on the liquid ejection side and a center of the bottom surface of the counterbore section to be E, relationship $l/2+L/2+E<F<L$ is satisfied.

12. A method of manufacturing a liquid ejection head comprising the step of manufacturing a liquid ejection head by using a nozzle plate manufactured by the method of manufacturing a nozzle plate as defined in claim 1.

13. The method of manufacturing a nozzle plate as defined in claim 1, wherein in the lyophobic film forming step, the lyophobic film is formed on the bottom surface of the counterbore section on the liquid ejection side of the nozzle plate, side walls of the counterbore section and a peripheral region of an outside of the counterbore section.

14. The method of manufacturing a nozzle plate as defined in claim 1, wherein in the lyophobic film forming step, the lyophobic film is formed, from the liquid ejection side of the nozzle plate, on the bottom surface of the counterbore section, the opening edge of the nozzle on the liquid ejection side and the inner wall of the nozzle, in a state where a filling material is not embedded into the nozzle of the nozzle plate.

* * * * *